United States Patent [19]

Hofmeister

[11] Patent Number: 5,569,014
[45] Date of Patent: Oct. 29, 1996

[54] FROG-LEG ROBOT HAVING WALKING-BEAMS

[75] Inventor: Christopher Hofmeister, Hampstead, N.H.

[73] Assignee: Brooks Automation, Inc., Chelmsford, Mass.

[21] Appl. No.: 287,090

[22] Filed: Aug. 8, 1994

[51] Int. Cl.[6] ........................................ B25J 9/06
[52] U.S. Cl. .................. 414/744.3; 414/662; 414/744.5; 414/937
[58] Field of Search ................. 414/744.3, 744.5, 414/749, 751, 662, 937; 74/490.08, 490.09, 490.13, 469

[56] References Cited

U.S. PATENT DOCUMENTS

| | | | |
|---|---|---|---|
| 4,536,124 | 8/1985 | Silvestri | 414/744.3 |
| 4,666,366 | 5/1987 | Davis | 414/749 |
| 4,730,876 | 3/1988 | Davis et al. | 414/749 |
| 5,180,276 | 1/1993 | Hendrickson | 414/752 |

FOREIGN PATENT DOCUMENTS 0607767  5/1978  U.S.S.R. ........................... 414/744.3

*Primary Examiner*—Donald W. Underwood
*Attorney, Agent, or Firm*—Nields & Lemack

[57] ABSTRACT

The end effector of a frog-leg robot is raised and lowered by using walking-beams to effect a vertical movement of the fore arms at the elbow joint.

3 Claims, 3 Drawing Sheets

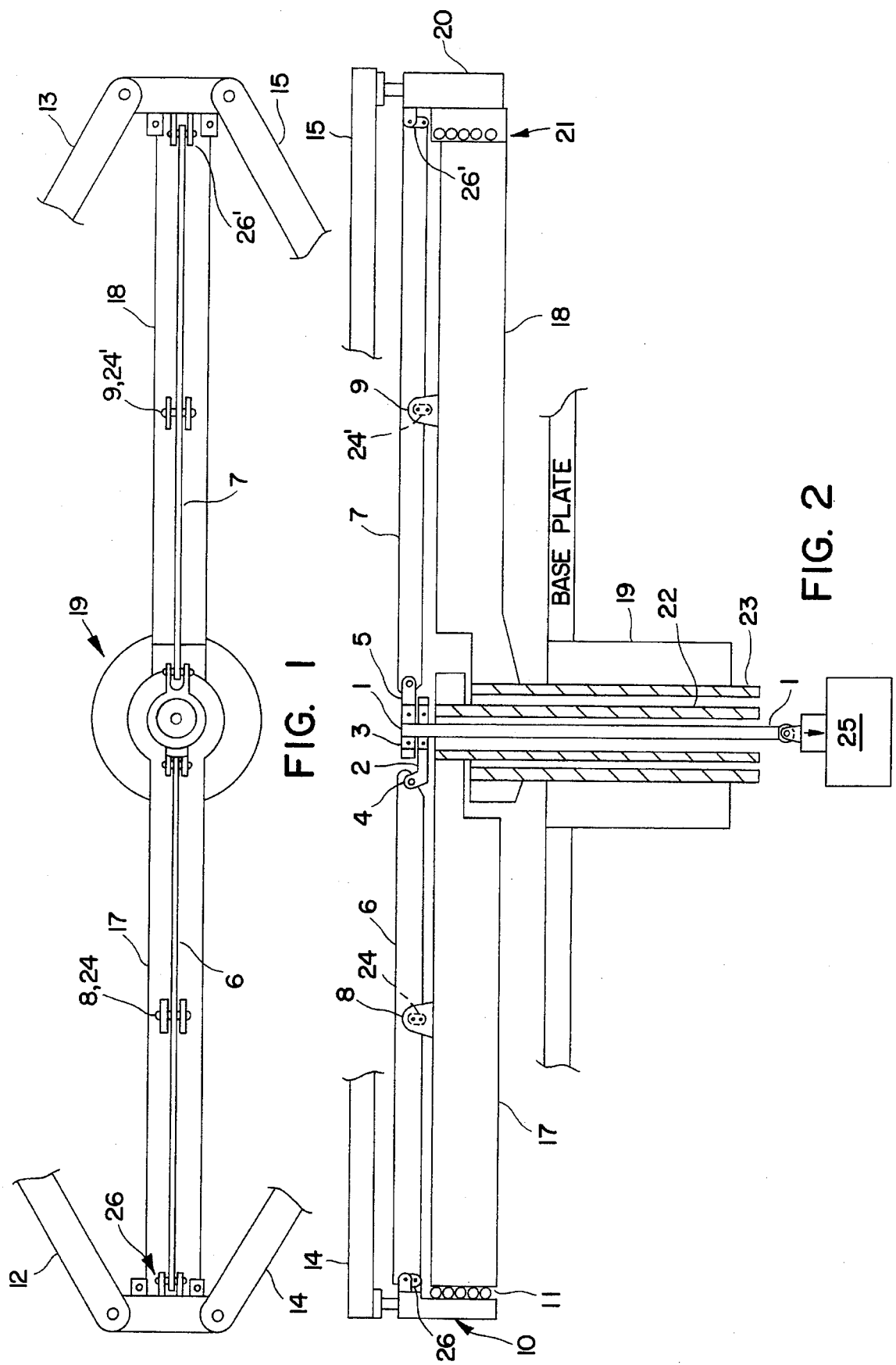

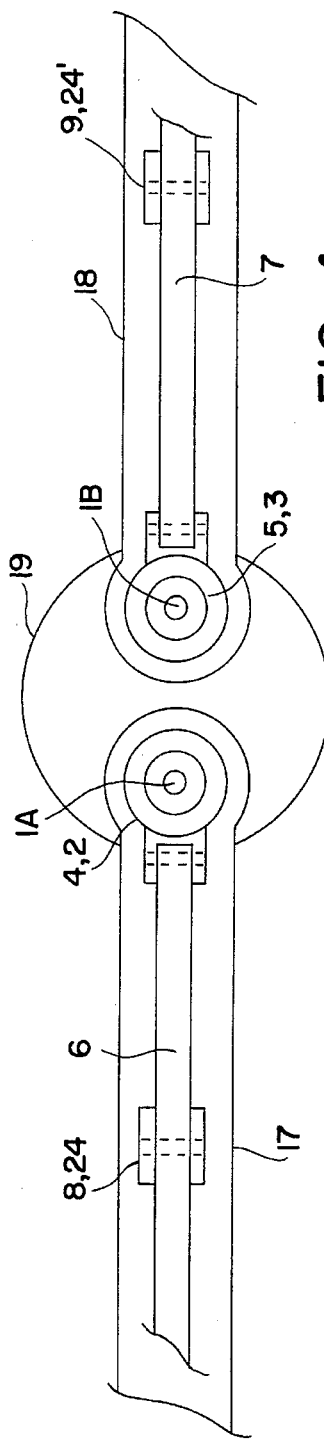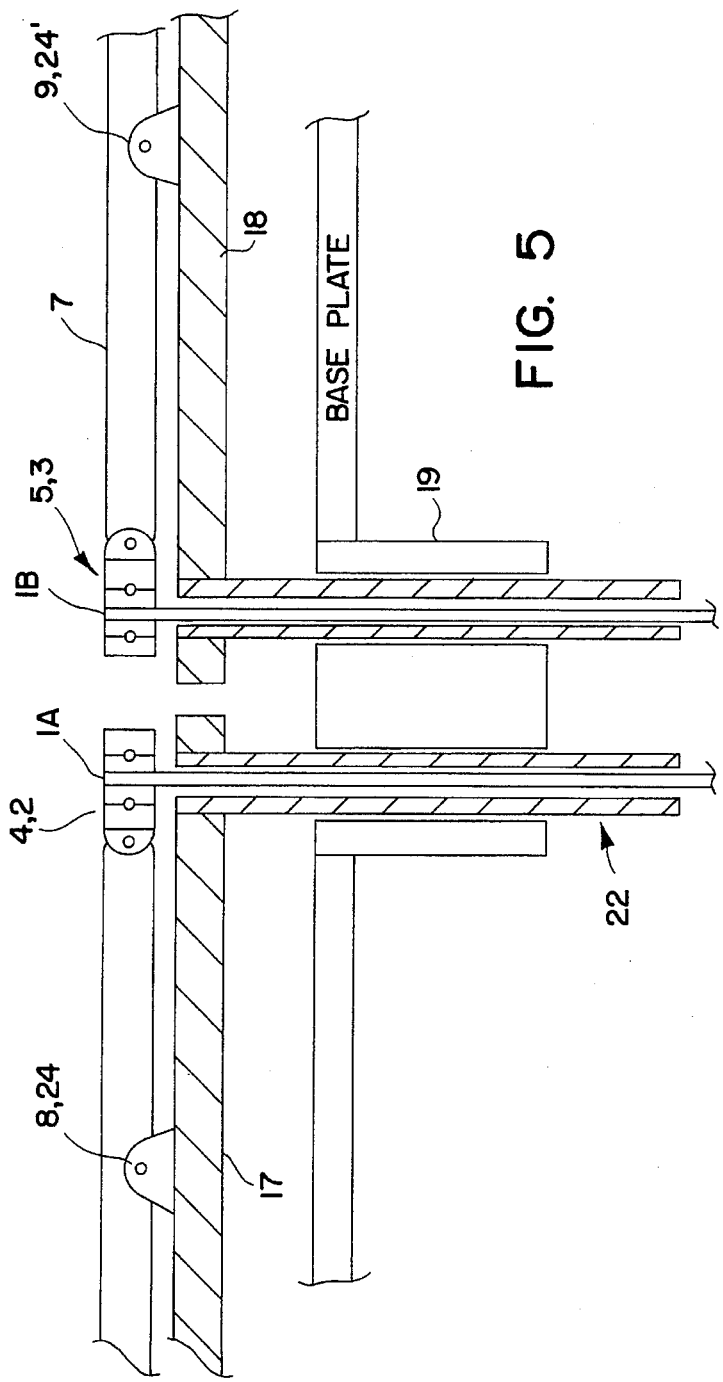

FROG-LEG ROBOT HAVING WALKING-BEAMS

BACKGROUND OF THE INVENTION

1. Field of the Invention

The present invention relates to articulated arm transfer devices.

2. Description of the Related Art

The transfer of delicate silicon wafers or the like between a plurality of work stations or locations in the manufacture of semiconductor devices presents unique handling problems. The silicon wafers are very delicate and have highly polished surfaces. When the wafers are abruptly moved, they tend to slide. This sliding action can cause the silicon wafers to abrade or alternatively can cause damage to their edges if they collide.

There are numerous devices described in the prior art for transferring silicon wafers. Some examples are given in U.S. Pat. No. 5,180,176. In particular, U.S. Pat. Nos. 4,666,366 and 4,909,701 disclose wafer transfer handling apparatus having an articulated arm assembly which extends and retracts in a "froglike" motion to transfer an object such as a wafer between a plurality of locations. Two articulated arms are operatively coupled such that when one arm is driven by a motor the articulated arms extend and retract in a "froglike" or "frogkick" type of motion. A platform is coupled to the arms and has the object to be transferred disposed thereon.

As the size of substrates (such as, for example, flat-panel TV screens) becomes larger, the size of the robots used in their fabrication becomes larger also, and the prior practice of raising the whole robot to effect the pick-up of the substrate requires excessive power and time.

SUMMARY OF THE INVENTION

The present invention, by the use of walking-beam levers and a pull rod at the center of rotation (shoulder block) effects vertical motion at the elbows, reducing the weight to be moved to that of the fore-arms and end effector.

A second benefit is the elimination of vertical motion of the shoulders, allowing for simplified bearing and seal assemblies.

BRIEF DESCRIPTION OF THE DRAWINGS

The invention may best be understood from the following detailed description thereof, having reference to the accompanying drawings, in which:

FIG. 1 is a plan view of a frog-leg robot constructed in accordance with the invention;

FIG. 2 is a side view, partly in vertical central section, of the robot of FIG. 1;

FIG. 4 is a plan view similar to that of FIG. 1 showing another embodiment of a frog-leg robot constructed in accordance with the invention; and FIG. 5 is a side view, partly in vertical central section, of the robot of FIG. 4.

DESCRIPTION OF THE PREFERRED EMBODIMENT

Figure 3:
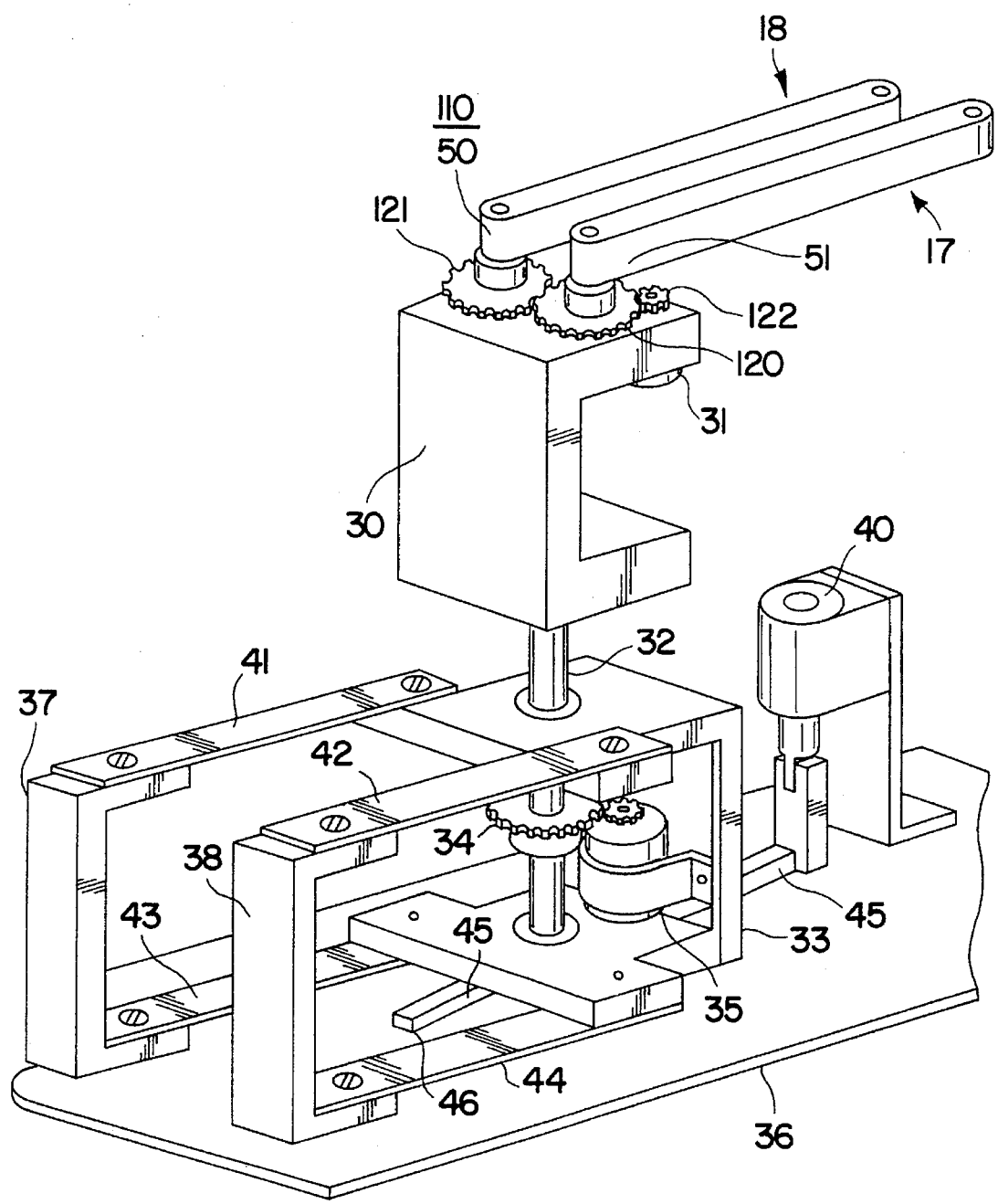
FIG. 3 is an isometric view of prior art apparatus which may be used in an embodiment of the present invention of the type shown in FIGS. 4 and 5.

Referring to the drawings, a non-rotating lift-rod 1 is mounted so as to provide motion in the vertical direction of said lift-rod and components affixed thereto. Such vertical motion is hereinafter sometimes referred to as "Z motion". A walking-beam 6 is mounted on a hinge block 4 affixed to the outer portion of a bearing 2 the inner portion of which is affixed to the lift-rod 1. Similarly, a walking-beam 7 is mounted on a hinge block 5 affixed to the outer portion of a bearing 3 the inner portion of which is affixed to the lift-rod 1. The bearings 2, 3 allow the beams 6, 7, respectively, to rotate relative to shaft 1, and the hinge blocks 4, 5 allow the beams 6, 7, respectively, to tilt relative to the bearings 2, 3, respectively. The fulcrum 8 of walking-beam 6 is mounted on a roller or yoke 24 to allow for arc motion of beam 6; the fulcrum 9 of walking-beam 7 is similarly mounted on a roller or yoke 24' to allow for arc motion of beam 7.

The robot of FIGS. 1 and 2 includes fore arms 12, 13, 14, 15 of the type shown in U.S. Pat. No. 5,180,276 and upper arms 17, 18 of the type shown in said U.S. Patent. An elbow block 10, provided with pins to receive fore arms 12 and 14, is mounted on walking-beam 6 by means of a linear bearing block 11 which allows elbow block 10 to move up and down relative to upper arm 17. An elbow block 20, provided with pins to receive fore arms 13 and 15, is mounted on walking-beam 7 by means of a linear bearing block 21 which allows elbow block 20 to move up and down relative to upper arm 18.

All of the aforementioned components are mounted upon a center support assembly 19, constructed as shown in said U.S. Pat. No. 5,180,276, which contains bearing, motors and encoders as needed to move the various arms 12–15, 17–18. Upper arm 17 is rotated by means of a hollow shaft 22 to which it is affixed, and upper arm 18 is rotated by means of a hollow shaft 23 to which it is affixed. The lift-rod 1 is raised and lowered by means of, for example, a cylinder or solenoid 25, or a motor, etc.

As shown in FIG. 3 (which is identical to FIG. 2 of said U.S. Pat. No. 5,180,276 except for alteration of the Figure number and certain reference numerals), upper arms 17, 18, include generally circular gears 120, 121 respectively. The gears 120, 121 may be integrally formed as part of the upper arms 17, 18 or they may be individually formed and affixed to the upper arms by any suitable fastening method. The gear 120 is operatively coupled to a drive pinion 122. The gear 120 is driven by the drive pinion 122 and in turn gear 120 drives gear 121. The drive gears 120 and 121 and the pinion 122 may be replaced by any suitable drive mechanism such as frictional surfaces or band and drum assemblies. Thus, the axis about which the gear 121 rotates is spaced from the axis about which the gear 120 rotates, the second upper arm 18 is driven by rotation of the first upper arm 17 by means of the gears 120, 121, and the first upper arm 17 is driven by the drive pinion 122 via the gear 120.

In the preferred embodiment of the present invention, as shown in FIGS. 1 and 2, the two shoulder shafts 22, 23 are concentric, rather than parallel. A description of the robot is set forth in co-pending patent application Ser. No. 08/048,833 filed Apr. 16, 1993.

The pull rod 1 is added through the hole in the inner shaft, the lower end of the pull rod 1 is connected to an actuator 25 which will pull the lower end downward. The actuator 25 may be, for example, a cylinder, motor, or solenoid, etc. The upper end of the rod extends above the robot shoulder assembly and is connected to the walking-beams on the two upper arms. If the unit is operating in vacuum the rod may pass through a bellows assembly seal in the vacuum chamber, allowing the actuator to be located in atmosphere.

At the top of rod 1 two bearing assemblies 4, 5 allow the rod to stand stationary while the arms rotate, and for the arms 17, 18 to be fixed vertically while the rod moves up and down.

An additional bearing, fulcrum or flexure in 4 and 5 will allow rotation of the beams 6, 7 about their center fulcra 8, 9 without bending forces on the rod end.

At the end of each upper arm an elbow block 10, 20 carrying the shaft(s) for the elbow motion of the forearms, is mounted by means of a vertical motion linear bearing 11, 21 to allow the elbow blocks, forearms and end effectors to be raised to pick a substrate, and lowered to place it. Said linear bearing 11, 21 may be, for example, a ball slide.

The two beams 6, 7, acting as simple levers, raise the elbow blocks when the rod 1 is pulled downward. Each beam pivots at a central point selected for mechanical advantage and is affixed to the central and elbow fulcra by a mechanism 24, 24' and 26, 26', respectively, which will allow for free vertical motion of the elbow block independent of the arc motion of the lever ends. Said mechanism 24, 24', 26, 26' may be, for example, a yoke, flexure, or roller.

The aforementioned Z-motion mechanism has been shown embodied in a device of the type disclosed in said U.S. patent application Ser. No. 08/048,833 having "MULTITRAN" arms of the type shown in U.S. Pat. No. 5,180,276, but may be adapted to other articulated arm transfer devices with non-concentric shafts, such as those shown in U.S. patent application Ser. No. 07/997,773 now U.S. Pat. No. 5,431,529, and frog-leg type robots such as those shown in the aforementioned U.S. Pat. No. 4,666,366.

In the case of parallel-shaft robots the two rod end assemblies 4, 5 must be mounted on a rod head with the bearing axes concentric with the robot arm axes.

This may be accomplished by a simple modification of the apparatus of FIG. 2, such as that shown in FIGS. 4 and 5. Thus, repeating the above description of FIGS. 1 and 2, suitably modified so as to apply to FIGS. 4 and 5, two non-rotating lift-rods 1A and 1B are mounted so as to provide motion in the vertical direction of said lift-rod and components affixed thereto. Such vertical motion is herein sometimes referred to as "Z motion". A walking-beam 6 is mounted on a hinge block 4 affixed to the outer portion of a bearing 2 the inner portion of which is affixed to a first lift-rod 1A. Similarly, a walking-beam 7 is mounted on a hinge block 5 affixed to the outer portion of a bearing 3 the inner portion of which is affixed to a second lift-rod 1B. The bearings 2, 3 allow the beams 6, 7, respectively, to rotate relative to shafts 1A, 2A, respectively, and the hinge blocks 4, 5 allow the beams 6, 7, respectively, to tilt relative to the bearings 2, 3, respectively. The fulcrum 8 of walking-beam 6 is mounted on a roller or yoke 24 to allow for arc motion of beam 6; the fulcrum 9 of walking-beam 7 is similarly mounted on a roller or yoke 24' to allow for arc motion of beam 7.

The robot of FIGS. 4 and 5 includes fore arms 12, 13, 14, 15 of the type shown in U.S. Pat. No. 5,180,276 and upper arms 17, 18 of the type shown in said U.S. Patent. An elbow block 10, provided with pins to receive fore arms 12 and 14, is mounted on walking-beam 6 by means of a linear bearing block 11 which allows elbow block 10 to move up and down relative to upper arm 17. An elbow block 20, provided with pins to receive fore arms 13 and 15, is mounted on walking-beam 7 by means of a linear bearing block 21 which allows elbow block 20 to move up and down relative to upper arm 18.

All of the aforementioned components are mounted upon a center support assembly 19, constructed as shown in said U.S. Pat. No. 5,180,276, which contains bearing, motors and encoders as needed to move the various arms 12–15, 17–18. Upper arm 17 is rotated by means of a hollow shaft 22 to which it is affixed, and upper arm 18 is rotated by means of a hollow shaft 23 to which it is affixed.

As is well known in the mechanical arts, a walking-beam is an oscillating beam for the transmission of power, such as has been used in steamboats and in devices for drilling for oil. The term has been used in the foregoing description wherein its motion and function play a similar role.

Having thus described the principles of the invention, together with several illustrative embodiments thereof, it is to be understood that although specific terms are employed, they are used in a generic and descriptive sense, and not for purposes of limitation, the scope of the invention being set forth in the following claims.

I claim:

1. An apparatus for transferring objects, comprising a support, a first upper arm having a shoulder end and an elbow end and being supported on said support so as to be rotatable about a first axis at said shoulder end, a second upper arm having a shoulder end and an elbow end and being supported on said support so as to be rotatable about a second axis at said shoulder end of said second upper arm, at least one pair of forearms each having a wrist end and an elbow end and being articulated to said first and second upper arms at their respective elbow ends, each of said upper arms being of lesser length than each forearm, at least one end effector pivotally coupled to said pair of forearms at the wrist ends thereof, at least one engagement means connected between said pair of forearms and preventing rotation of said end effector, and means capable of driving said upper arms for rotation through an angle in the range of from greater than 120° up to and including 180° to move said end effector between an extended position and a retracted position, the improvement comprising:

a lift-rod mounted near the shoulder ends of said upper arms, at least two elbow blocks each of which is slidably mounted upon the elbow end of an upper arm, at least two walking-beams each having a fulcrum which is mounted upon an upper arm intermediate the ends thereof, each having one end which is affixed to said lift-rod in a vertically and horizontally rotatable manner and another end which is mounted in a vertically rotatable manner to one of said elbow blocks, the elbow ends of said fore arms being affixed to one of said elbow blocks in a horizontally rotatable manner, and means for imparting vertical movement to said lift-rod, whereby vertical movement is imparted to said end effector and said fore arms but not to said upper arms nor to the components which drive said upper arms.

2. An apparatus for transferring objects, comprising a support, a first upper arm having a shoulder end and an elbow end and being supported on said support so as to be rotatable about a first axis at said shoulder end, a second upper arm having a shoulder end and an elbow end and being supported on said support so as to be rotatable about a second axis at said shoulder end of said second upper arm, at least one pair of forearms each having a wrist end and an elbow end and being articulated to said first and second upper arms at their respective elbow ends, each of said upper arms being of lesser length than each forearm, at least one end effector pivotally coupled to said pair of forearms at the wrist ends thereof, at least one engagement means connected between said pair of forearms and preventing rotation of said end effector, and means capable of driving said upper arms for rotation through an angle in the range of from greater than 120° up to and including 180° to move said end effector between an extended position and a retracted position, wherein said second axis is spaced from said first axis and wherein there is provided means connected between said first and second upper arms for causing said second upper arm to be driven by rotation of said first upper arm, and wherein said means capable of driving said upper arms drives said first upper arm, the improvement comprising:

- at least two lift rods each of which is mounted near the shoulder end of an upper arm,
- at least two elbow blocks each of which is slidably mounted upon the elbow end of an upper arm,
- at least two walking-beams each having a fulcrum which is mounted upon an upper arm intermediate the ends thereof, each having one end which is affixed to one of said lift-rods in a vertically and horizontally rotatable manner and another end which is mounted in a vertically rotatable manner to one of said elbow blocks,
- the elbow ends of said forearms being affixed to one of said elbow blocks in a horizontally rotatable manner, and
- means for imparting vertical movement to said lift-rods, whereby vertical movement is imparted to said end effector and said forearms but not to said upper arms nor to the components which drive said upper arms.

3. The apparatus according to claim 1 wherein said second axis is substantially coincident with said first axis.

* * * * *